US009524711B2

(12) United States Patent
Owen, Jr. et al.

(10) Patent No.: US 9,524,711 B2
(45) Date of Patent: Dec. 20, 2016

(54) PANEL ASSEMBLY HAVING STRUCTURAL ADHESIVE JOINT

(71) Applicant: Shiloh Industries, Inc., Valley City, OH (US)

(72) Inventors: Devon E. Owen, Jr., Canton, MI (US); Jonathan W. Fisk, Canton, MI (US); Mark C. Thurber, Lake Orion, MI (US); William A. Mackowski, Shelby Township, MI (US)

(73) Assignee: Shiloh Industries, Inc., Valley City, OH (US)

( * ) Notice: Subject to any disclaimer, the term of this patent is extended or adjusted under 35 U.S.C. 154(b) by 0 days.

(21) Appl. No.: 14/894,216

(22) PCT Filed: May 30, 2014

(86) PCT No.: PCT/US2014/040390
§ 371 (c)(1),
(2) Date: Nov. 25, 2015

(87) PCT Pub. No.: WO2014/194294
PCT Pub. Date: Dec. 4, 2014

(65) Prior Publication Data
US 2016/0118033 A1    Apr. 28, 2016

Related U.S. Application Data

(60) Provisional application No. 61/829,716, filed on May 31, 2013.

(51) Int. Cl.
*G10K 11/168*    (2006.01)
*B60R 13/08*    (2006.01)
(Continued)

(52) U.S. Cl.
CPC .............. *G10K 11/168* (2013.01); *B32B 7/12* (2013.01); *B32B 15/043* (2013.01); *B32B 37/06* (2013.01);
(Continued)

(58) Field of Classification Search
CPC ...... B60R 13/08; B60J 5/0418; G10K 11/168; B32B 7/12
(Continued)

(56) References Cited

U.S. PATENT DOCUMENTS 7,784,165 B2 *    8/2010    Xiao .......................... B32B 1/00
                                                                                  181/290
2004/0214008 A1 *    10/2004    Dobrusky ............... B32B 15/08
                                                                                  428/421
(Continued)

FOREIGN PATENT DOCUMENTS

WO    WO2012129386 A2    9/2012

OTHER PUBLICATIONS

International Search Report and Written Opinion dated Sep. 24, 2014, 15 pages.

*Primary Examiner* — Jeremy Luks
(74) *Attorney, Agent, or Firm* — Reising Ethington, P.C.

(57) ABSTRACT

A panel assembly that includes a main panel, a sound-damping patch, a sound-damping adhesive layer, and a structural adhesive joint. The structural adhesive joint may be used in place of spot welds, clinched joints or other metal joining mechanisms that would prohibit the panel assembly from being used in certain applications, such as class A surfaces on a vehicle that can be seen or touched by a customer.

17 Claims, 5 Drawing Sheets

(51) Int. Cl.
  *G10K 11/16*  (2006.01)
  *B32B 7/12*   (2006.01)
  *B32B 15/04*  (2006.01)
  *B32B 37/06*  (2006.01)
  *B32B 37/10*  (2006.01)
  *B32B 37/12*  (2006.01)
  *B32B 37/14*  (2006.01)
  *B60J 5/04*   (2006.01)

(52) U.S. Cl.
  CPC ............... *B32B 37/10* (2013.01); *B32B 37/12* (2013.01); *B32B 37/142* (2013.01); *B60J 5/0418* (2013.01); *G10K 11/16* (2013.01); *B32B 2250/02* (2013.01); *B32B 2255/06* (2013.01); *B32B 2255/26* (2013.01); *B32B 2307/102* (2013.01); *B32B 2605/00* (2013.01)

(58) Field of Classification Search
  USPC ........................................ 181/204, 205, 290
  See application file for complete search history.

(56) References Cited

U.S. PATENT DOCUMENTS

| | | | |
|---|---|---|---|
| 2005/0217933 A1* | 10/2005 | Sung Young | B60R 13/083 181/290 |
| 2009/0183821 A1* | 7/2009 | Schroeder | B32B 33/00 156/242 |
| 2011/0315473 A1 | 12/2011 | Fetsko | |
| 2012/0125710 A1 | 5/2012 | Fisk | |
| 2012/0181811 A1 | 7/2012 | Fisk | |
| 2012/0228899 A1 | 9/2012 | Rich | |

* cited by examiner

PANEL ASSEMBLY HAVING STRUCTURAL ADHESIVE JOINT

REFERENCE TO RELATED APPLICATIONS

This application claims the benefit of U.S. Provisional Application Ser. No. 61/829,716 filed on May 31, 2013, the entire contents of which are incorporated herein by reference.

TECHNICAL FIELD

The present disclosure generally relates to structures for reducing noise and/or vibrations and, more particularly, to a multi-layer panel assembly that may be used in vehicles.

BACKGROUND

During metal forming processes, a multi-layer panel assembly having a sound-damping patch and a main panel attached via a viscoelastic adhesive layer may experience relative movement due to the extreme forces and stress incurred during the forming process. Typically, spot welds are used to facilitate attachment between the main panel and the sound-damping patch. It may, however, be desirable in some instances, such as forming panels with class A surfaces, to use a structural adhesive joint that has a negligible impact on the show surfaces of a formed panel assembly.

SUMMARY

According to one aspect, there is provided a panel assembly comprising: a main panel having an acoustically active region, the acoustically active region is exposed to a sound source, a vibration source, or both; a sound-damping patch adhered to the main panel, the sound-damping patch is smaller in size than the main panel and is located on the main panel so that it covers at least a portion of the acoustically active region; a sound-damping adhesive layer at least partially located between the main panel and the sound-damping patch, the sound-damping adhesive layer adheres the sound-damping patch to the main panel and is located on the main panel so that covers at least a portion of the acoustically active region; and a structural adhesive joint at least partially located between the main panel and the sound-damping patch and having a plurality of structural adhesive elements. The sound-damping adhesive layer covers an entire surface of the sound-damping patch while the plurality of structural adhesive elements are arranged according to the shape of the sound-damping patch.

According to another aspect, there is provided a method for making a panel assembly. The method may comprise the steps of: providing a main panel made of metal; providing a sound-damping patch made of metal, the sound-damping patch is smaller in size than the main panel; applying a sound-damping adhesive to at least one of the main panel or the sound-damping patch; applying a structural adhesive to the at least one of the main panel or the sound-damping patch on top of the sound-damping adhesive, wherein the structural adhesive has a higher viscosity at ambient temperature than the sound-damping adhesive and is applied so that the structural adhesive at least partially displaces the sound-damping adhesive and contacts the at least one of the main panel or the sound-damping patch; and bonding the sound-damping patch to the main panel with both the sound-damping adhesive and the structural adhesive in order to form the panel assembly.

DRAWINGS

Preferred exemplary embodiments will hereinafter be described in conjunction with the appended drawings, wherein like designations denote like elements, and wherein.

DETAILED DESCRIPTION

The panel assembly described herein may be used in any number of different applications in order to reduce noise or vibrations, provide thermal insulation, and/or improve the structural integrity of an underlying part. Although the panel assembly is described below in the context of vehicle applications, it should be appreciated that it is not so limited and may be used with non-vehicle applications as well. Some examples of potential vehicle applications include wheel wells, seat tubs, spare wheel tubs, dash panels, plenums, cowls, roof panels, floor pans, hoods, deck lids, door inners, door outers, parcel shelves, oil pans, closure outers, tailgates, covers and housings for various engine and transmission components, as well as other vehicle applications. Some potential non-vehicle examples include aerospace applications, marine applications, military applications, farm and construction equipment, home appliances, as well as any other application where it is desirable to reduce noise or vibrations in a stiff or rigid part. Skilled artisans will appreciate that the panel assembly described herein has a structural adhesive joint that may be particularly useful for certain class A vehicle surfaces (e.g., any vehicle surface that can be seen or touched by the customer) because of its minimal impact on the aesthetic qualities of a resulting part;

this is particularly true in comparison to other panel assemblies that use spot welds or TOX joints instead.

Figure 1:
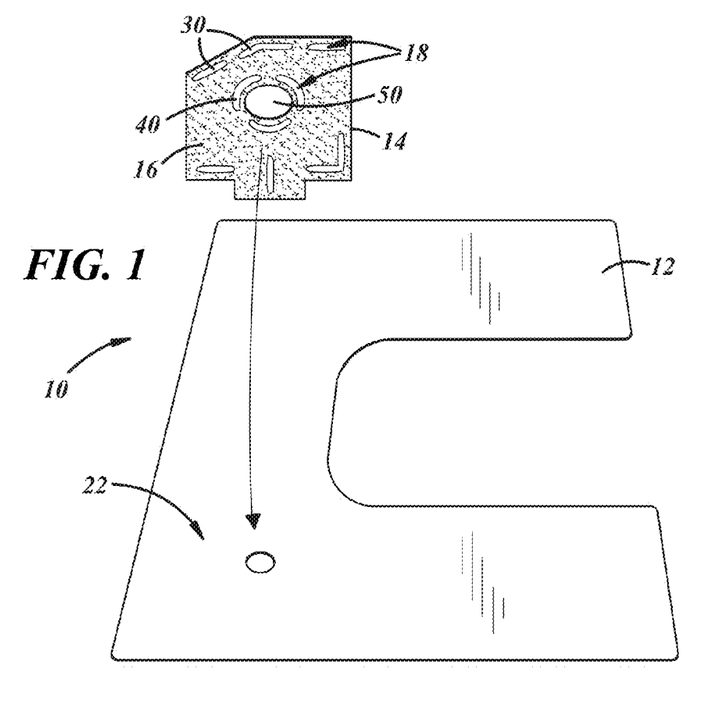
FIG. 1 is a perspective view of an exemplary panel assembly before a sound-damping patch is attached to a main panel and before the panel assembly is formed into a vehicle dash panel.
Figure 2:
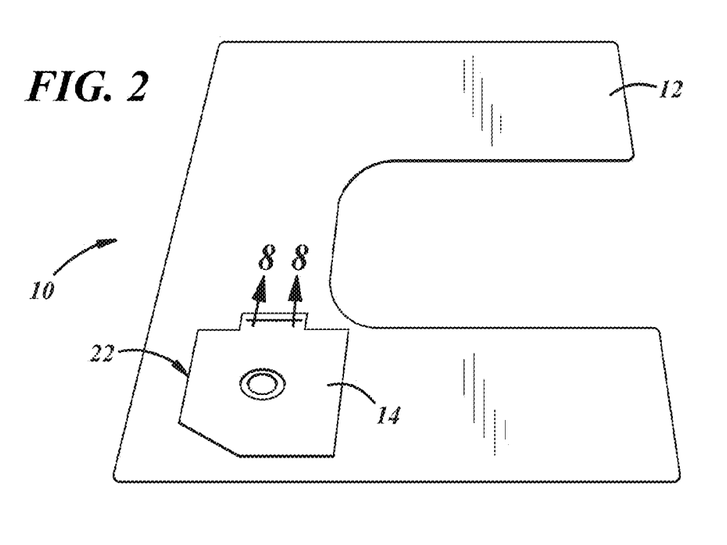
FIG. 2 is a perspective view of the panel assembly from FIG. 1 after the sound-damping patch is attached to the main panel but before the panel assembly is formed into a vehicle dash panel.
Figure 3:
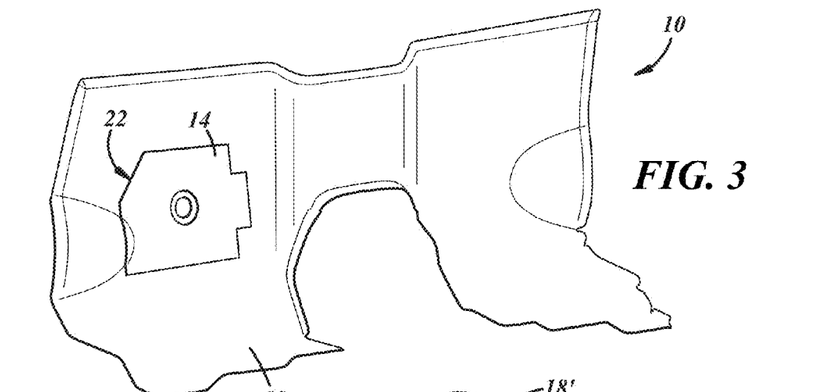
FIG. 3 is a perspective view of the panel assembly from FIG. 2 after the panel assembly is formed into a vehicle dash panel.

FIGS. 1 and 2 show an exemplary panel assembly 10 that has not yet been formed into a vehicle dash panel and generally includes a main panel 12, a sound-damping patch 14, a viscoelastic adhesive layer 16, and a structural adhesive joint 18. Because sound-damping patch 14 is smaller in size than the underlying main or base panel 12, the panel assembly 10 is generally referred to as a constrained layer or a panel laminate construction. The structural adhesive joint disclosed herein may be used with such constrained layer constructions, as well as full laminates that include an adhesive layer sandwiched between two sheets or skins of roughly the same size. In order to stamp, draw, or otherwise form panel assembly 10 into a corresponding three-dimensional part, like a dash panel, the panel assembly may need to utilize some type of joining feature to maintain the patch and main panel together so that the assembly does not delaminate, rip, tear, buckle, etc. during the forming process. This is particularly true in the case where both the main panel 12 and the sound-damping patch 14 are made from some type of metal, as it can be important to control material flow during forming so that the metal from both components flows together in a coordinated manner. In the past, spot welds have been used for such purposes, but there are certain limitations associated with spot welding a sound-damping patch to a main panel that may be avoided with the structural adhesive joint disclosed herein.

The term "panel assembly," as used herein, is not limited to any particular stage or phase of the manufacturing process, and may include: a panel assembly where the periphery of the panel has not yet been cut or trimmed to its final shape; a panel assembly where the periphery of the panel has already been cut or trimmed to its final shape; a panel assembly where the panel has not yet been stamped, bent or otherwise formed into its final contoured shape; a panel assembly where the panel has already been stamped, drawn or otherwise formed into its final contoured shape; a panel assembly where the panel has not yet been attached to a vehicle or other structure; or a panel assembly where the panel has already been attached to a vehicle or other structure, such as in a vehicle dash panel or wheel well, to cite a few possibilities. Thus, the term "panel assembly" may refer to a partially, mostly, or completely formed part.

Main panel 12 acts as the structural foundation for the panel assembly 10 and can be blanked, cut, sheared or otherwise formed into a desired shape. In a constrained layer construction, like that shown here, main panel 12 is typically larger than sound-damping patch 14, although it may be used in a laminate construction where both components are the same size. Main panel 12 may be made from any number of suitable materials, including various types and alloys of steel (e.g., low-carbon steel, cold rolled steel, hot dipped steel, electro-galvanized steel, galvanneal, various types of high- and ultra high-strength steels, etc.), aluminum, other metals, or non-metal materials such as polymer-based materials or composites. In certain exemplary embodiments, main panel 12 is made from suitable steel and has a thickness of about 0.4 mm to 3.0 mm, inclusive; in other exemplary embodiments, main panel 12 is made from a multi-layer sound-damping laminate itself. The exact size, shape, thickness and composition of main panel 12 are largely driven by the particular part that is being formed, and certainly may differ from the exemplary embodiments shown and described here.

Sound-damping patch 14 may be strategically applied to main panel 12 to help reduce or mitigate the transmission of noise or vibrations in the panel assembly 10. Sound-damping patch 14 is typically attached to main panel 12 at a location that corresponds to an acoustically active region of the panel, such as region 22. An "acoustically active region," as used herein, broadly includes any section, portion and/or other region of the main panel that is exposed to a sound and/or vibration source and can benefit from some type of sound-damping. In the example shown, acoustically active region 22 is located on the dash panel at a location that is proximate a noise or heat source in the engine compartment so that the sound-damping patch 14 can help reduce the amount of noise and vibrations coming into the passenger compartment of the vehicle. Like the main panel above, the sound-damping patch 14 may be made from any number of suitable materials, including various types and alloys of steel (e.g., low-carbon steel, cold rolled steel, hot dipped steel, electro-galvanized steel, galvanneal, various types of high- and ultra high-strength steels, etc.), aluminum, other metals, or non-metal materials such as polymer-based materials or composites. In certain exemplary embodiments, the sound-damping patch is made from suitable steel and has a thickness of about 0.2 mm to 3.0 mm, inclusive. Oftentimes, the sound-damping patch 14 has a thickness that is less than or equal to that of the main panel 12, although this is not necessary. It is also possible for the sound-damping patch 14 to be a multi-layer sound-damping laminate itself. The exact size, shape, thickness and composition of sound-damping patch 14 are largely driven by the particular part that is being formed, and certainly may differ from the exemplary embodiments shown and described here.

Some non-limiting examples of sound-damping patches that may be used with the panel assembly and the structural adhesive joint taught herein are disclosed in International Patent Application Nos. PCT/US2010/045172, filed Aug. 11, 2010; PCT/US2010/053589, filed Oct. 21, 2010; PCT/US2011/039939, filed Jun. 10, 2011; and PCT/US2012/030093 filed Mar. 22, 2012, the contents of which are all incorporated herein by reference.

The viscoelastic adhesive layer 16 helps to bond the sound-damping patch 14 to the main panel 12 and can, depending on its composition and the particular application in which it is used, perform other functions such as vibration and/or noise damping. According to one non-limiting example, the viscoelastic adhesive layer 16 is comprised of an acrylate-based thermoset resin and has a thickness of about 0.005 mm to 0.05 mm; however, other adhesive compositions and thicknesses may be used as well. The viscoelastic adhesive layer 16 can absorb and dissipate some of the vibrational energy in the panel assembly 10 by converting mechanical energy associated with the vibrations into thermal energy that is dispersed within the adhesive layer and, thus, reduces the noise associated therewith. The vibration damping is generally due to relative movement between a vibratory article (the main panel) and a rigid constraining layer (the sound-damping patch), which causes a shearing movement in the viscoelastic adhesive layer 16 which translates into heat energy. In a preferred embodiment, the viscoelastic adhesive layer 16 is roll coated across the entire sound damping patch 14 prior to forming the panel assembly 10.

Structural adhesive joint 18 is designed to maintain the sound-damping patch 14 to the main panel 12 in a manner that allows these components to be successfully stamped, drawn or otherwise formed together. As suggested above, when the sound-damping patch 14 and the underlying main panel 12 are formed at the same time, such as during a stamping or drawing process, the panel assembly 10 is subject to large stress and shearing forces due to the relative differences in material flow between the different components; these forces can result in delaminating, ripping, tearing, buckling, etc. if they are not managed or controlled properly. Accordingly, the structural adhesive joint 18 is designed to maintain the sound-damping patch and the main panel together during a forming process so that the materials of each component can better flow in concert with one another, as opposed to fighting one another and resulting in one of the defects listed above. According to a non-limiting embodiment, structural adhesive joint 18 includes one or more structural adhesive elements—a different type of adhesive than is used with the viscoelastic adhesive layer 16—that are selectively applied between the main panel 12 and the sound-damping patch 14 so that the two components can be secured together during a subsequent metal forming process. The structural adhesive joint 18 may be load bearing, to some degree, and is configured to control certain stress and shearing forces exerted during a metal forming process; it is preferable, but not necessary, that the structural adhesive joint 18 remain largely intact after the metal forming process due to the fact that it follows the flow of the metal layers during forming. It should be appreciated that the structural adhesive joint 18 may have any number of different chemical compositions, shapes, sizes and patterns, including the exemplary ones provided below.

Structural adhesive joint 18 may include any suitable type of adhesive, so long as it has the strength to maintain the main blank 12 and the sound-damping patch 14 together during a metal forming process and it is compatible with the viscoelastic adhesive layer 16. Some examples of classes of materials that may be used to form the structural adhesive joint 18 include epoxies, urethanes, acrylonitriles, methacrylates, phenolics, and combinations thereof; each of these materials possesses good bond strength and is generally chemically compatible with the viscoelastic adhesive layer 16. Epoxy-based structural adhesive joints are generally tough, durable, and have good bond strength. However, they can sometimes have a slower cure rate, be a bit brittle, and may be too viscous for certain manufacturing processes. Accordingly, in one embodiment, an epoxy-based material is used to form the main backbone or framework of the structural adhesive joint 18, and certain additional materials or constituents are added thereto to give the structural adhesive certain desirable properties. One or more of the materials listed above may be used as such additional materials.

Urethanes can be similar to epoxies, in that they can be tough, durable, and exhibit good bond strength and, in addition, urethanes are oftentimes more formable and can have faster cure rates than epoxies. Thus, it may be desirable to add one or more urethanes to an epoxy-based material in order to result in a strong, yet workable, structural adhesive that may be used in the structural adhesive joint 18. Acrylonitrile-based, acrylate-based, methacrylate-based, or phenolic-based materials or resins may also be added to an epoxy-based material in order to provide the structural adhesive joint 18. Skilled artisans will appreciate that acrylonitriles generally exhibit good impact resistance, high tensile and bending strength, and are tough; however, acrolynitriles typically need to be mixed with other materials as they do not come in liquid form and accordingly may be difficult to handle. Acrylates and methacrylates similarly have good impact resistance, toughness, and also have a fast cure rate and are flexible. Phenolics usually have high heat resistance and good bond strength and are also rather tough, but they typically require special care and handling because of their fumes. Phenolic-based adhesives may be more desirable when forming aluminum panel assemblies, as their coefficients of thermal expansions more closely match one another. It should be appreciated that the structural adhesive used in joint 18 may be an epoxy-based material that includes some combination of the aforementioned additional materials, as well as other materials not listed. It is also possible for the structural adhesive in joint 18 to be a urethane-based, acrylonitrile-based, acrylate-based, methacrylate-based or a phenolic-based material, as opposed to an epoxy-based material, or be based on some other material that is not listed here.

Some other considerations that may be taken into account when selecting the constituents of the structural adhesive joint 18 include chemical compatibility with the viscoelastic adhesive layer, similarity of curing properties with the viscoelastic adhesive layer, similarity of coefficients of thermal expansion between the structural adhesive and the metal panel layers, and sound damping behavior, to cite a few. Enhanced chemical compatibility between the viscoelastic can promote better cross-linking and increased bond strength. Providing viscoelastic and structural adhesives with similar curing properties or schedules can be beneficial in terms of manufacturability, as well as ensuring that heat needed to cure one material does not negatively affect or degrade the other material. Furthermore, it may be desirable to choose an adhesive with a similar coefficient of thermal expansion to the metal panel being used, because when there is a significant difference between the coefficients of linear expansion of the adhesive and the adherend, stresses may be more pronounced from changes in temperature during manufacture or operation. Some structural adhesives, such as those including epoxies, can even have the added benefit of sound damping at higher temperatures while the viscoelastic layer damps at lower temperatures, thereby providing a broader range of damping capability. Some non-limiting examples of structural adhesive joint material combinations that may be suitable and exhibit some of the properties mentioned above include: an epoxy-urethane material, an epoxy-acrylate material, an epoxy-methacrylate, an epoxy-phenolic material, as well as other epoxy- and non-epoxy-based materials. Skilled artisans will appreciate that other constituents, such as curatives, additives (e.g., carbon and other filler), surfactants, etc. may also be included in the structural adhesive joint 18.

The adhesive used for the structural adhesive joint may be liquid or solid. In one potential embodiment, the structural adhesive joint 18 includes a solvent-based high-viscosity adhesive material that is initially applied in a liquid form, becomes solid or semi-solid as the solvent-based carrier evaporates, and is activated or cured in a subsequent bonding operation where the main panel 12 and the sound-damping blank 14 are pressed together with heat so that the adhesive material flows out and bonds the two metal layers together. In another potential embodiment, the structure adhesive joint 18 includes an adhesive material that is provided in the form of a solid or semi-solid thin film material which is placed, in situ, between the main panel 12 and the sound-damping blank 14. Heat and/or pressure from a subsequent bonding operation can activate or cure the thin film adhesive material so that it securely bonds the sound-damping blank 14 to the main panel 12. The structural adhesive joint 18 may include a number of different solid, semi-solid or liquid materials, but it is preferable that it creates a bond or joint between the main panel 12 and the sound-damping patch 14 that is stronger than that created by the viscoelastic adhesive layer 16, even if the structural adhesive joint does not possess the same sound-damping qualities. In accordance with one embodiment, the structural adhesive material has a higher viscosity than the viscoelastic adhesive material at ambient temperature; this may help achieve a number of objectives, including improved application of the adhesive during manufacturing.

Structural adhesive joint 18 may also be provided according to different sizes and/or shapes, depending on the particulars of the part being formed. For example, it may be desirable to spread out stress and shearing forces from a metal forming operation across some length; in which case, an elongated adhesive joint may be desirable, as opposed to a single point adhesive joint that is more akin to a spot weld. FIGS. 1, 4, 6, and 7 are intended to demonstrate some of the different structural adhesive joint configurations that may be used, as they show structural adhesive joints having various shapes, sizes, and/or patterns of structural adhesive elements. Structural adhesive joint 18 includes one or more individual structural adhesive elements, including: linear elements, curved elements, and closed-shape elements, to cite a few examples. Various combinations of individual structural adhesive elements may be applied to the sound-damping patch 14 (as shown), to the main panel 12 or to both, and are selectively located in positions where stress and shearing forces are expected to exist. The length, width, volume, shape and/or size of each structural adhesive element may be individually selected through the use of software modeling or other techniques known in the art. Other combinations and patterns of structural adhesive elements are certainly possible.

Figure 6:
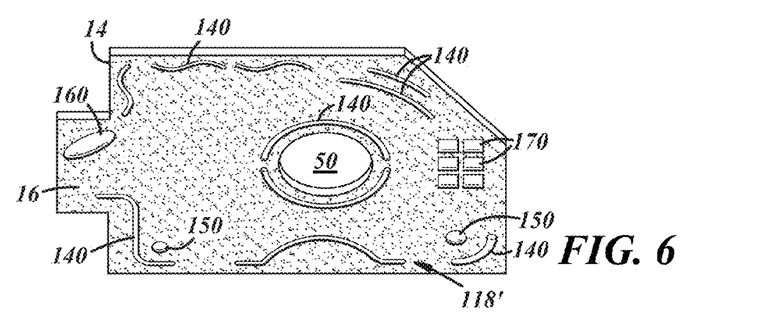
FIGS. 6 and 7 are perspective views of an underside of a sound-damping patch illustrating different exemplary patterns or embodiments of a structural adhesive joint.
Figure 7:
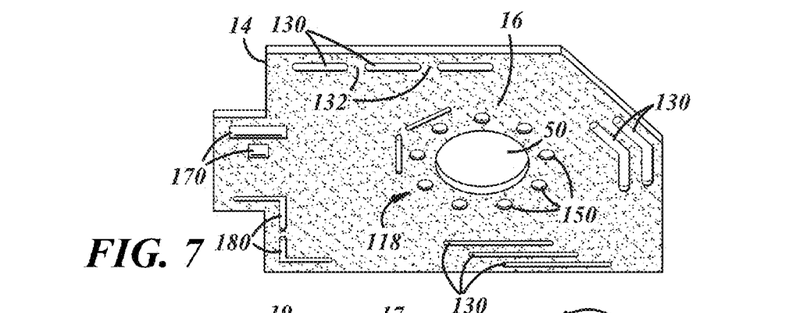

In the non-limiting embodiment of FIG. 1, the structural joint 18 includes a number of linear structural adhesive elements 30 and curved structural adhesive elements 40 located around the sound-damping patch 14. Turning now to FIGS. 6 and 7, there is shown other embodiments of a structural joint 118, 118' where, like the previous embodiment depicted in FIG. 1, different types of structural adhesive elements have been applied to the underside of a sound-damping patch 14 that also has a viscoelastic adhesive layer 16. The structural adhesive joints 118, 118' have different combinations of structural adhesive elements than does structural adhesive joint 18; this is done to illustrate some of the different structural adhesive joint possibilities. One potential advantage of using a structural adhesive joint to maintain the sound-damping patch 14 to the main panel 12, instead of using spot welds, involves the design flexibility of the structural adhesive elements, in terms of their size, shape and location.

Figure 4:
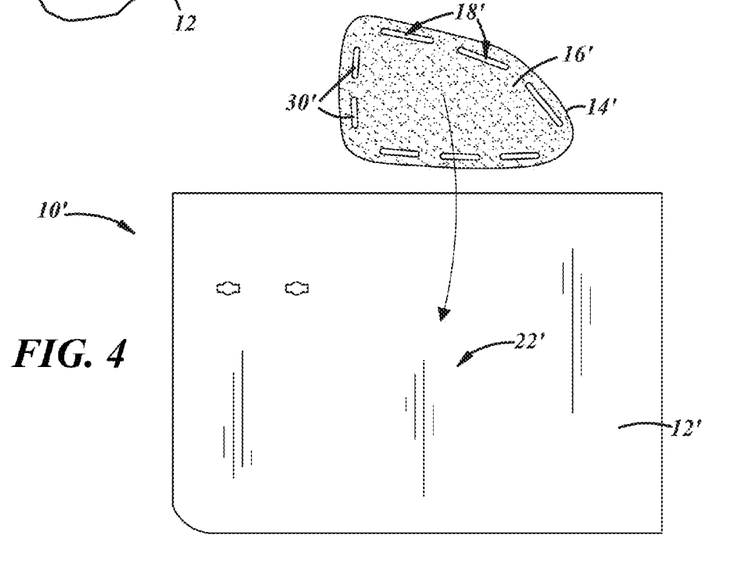
FIG. 4 is a perspective view of an exemplary panel assembly before a sound-damping patch is attached to a main panel and before the panel assembly is formed into a door outer.

Unlike spot welds, structural adhesive elements may be provided as linear elements 130 that help create a structural joint between the main panel 12 and the sound-damping patch 14 over some length or distance. Such an arrangement can have the benefit of spreading the stress and shearing forces of a metal forming operation across a length so that it is more uniformly or evenly distributed. It is sometimes beneficial to locate the linear structural adhesive elements 130 near the perimeter of the sound-damping patch 14 or in areas that are expected to experience a high degree of material flow during metal forming (i.e., high elongation areas). In some cases, it is preferable that the structural adhesive elements do not completely surround and encircle the perimeter of the sound-damping patch 14, as material from the patch may need some freedom to flow during metal forming. Because the structural adhesive joint 18 is more rigid than the viscoelastic adhesive layer 16—this generally makes the structural adhesive joint better at transmitting vibrations and, thus, a poor sound damping material—it may be beneficial to limit the overall length of the linear elements 130 to less than about 100 mm. This can be accomplished by breaking up a single linear structural adhesive element into a series of shorter elements separated by breaks or interruptions 132. As illustrated in FIGS. 1, 4, and 6, linear elements 30, 30', 130 can: include a single linear segment or multiple linear segments connected together, be arranged end-to-end (in series) or side-by-side (in parallel), be joined with other types of non-linear elements, form periodic or non-periodic patterns, be located near the perimeter or within the interior of a sound-damping patch, be arranged to generally follow the perimeter of a sound-damping patch or an opening in the patch, or be aligned so that they are generally perpendicular or parallel to draw lines which are representative of the flow of material during metal forming, to cite a few examples. In those embodiments where one or more structural adhesive elements follow or otherwise correspond to at least a portion of an exterior perimeter (i.e., outer edge or periphery of sound-damping patch) or at least a portion of an interior perimeter (i.e., inner edge or periphery of opening in sound-damping patch), it is said that structural adhesive elements are arranged according to the shape of the sound-damping patch.

The structural adhesive elements may also be provided as curved or arcuate elements 40, 140 that contribute to a structural adhesive joint between the main panel 12 and the sound-damping patch 14 over some curved extent. The curved elements 40, 140 may be designed to interact or otherwise accommodate some feature of the sound-damping patch 14 and/or the main panel 12. For example, curved elements 40 are designed to at least partially surround opening 50 which is formed in the sound-damping patch 14 in order to accommodate a steering column or other component. Curved elements 140 may be arranged to somewhat follow the perimeter of the sound-damping patch in the area of a corner or other perimeter transition so that material flow in such an area can be controlled or manipulated during metal forming operations. It may also be possible to apply the structural adhesive elements prior to punching or forming holes or other surface features. As best shown in FIGS. 1 and 7, curved elements 40, 140 may be can: include a single curved segment or multiple curved segments connected together (compound curves), be arranged end-to-end or side-by-side, be joined with other types of non-curved elements, form periodic or non-periodic patterns, be located near the perimeter or within the interior of a sound-damping patch, be arranged to generally follow the perimeter of a sound-damping patch or an opening in the patch, or be aligned so that they are generally perpendicular or parallel to draw lines which are representative of the flow of material during metal forming, to cite a few examples. In many of the exemplary embodiments, the adhesive joint includes a number of adhesive joint segments that are thin and elongated and are arranged in a non-periodic pattern to follow or correspond to the exterior or interior periphery of the sound-damping patch.

It is also possible to provide the structural adhesive elements in the form of circles, ovals, squares, rectangles, and other closed shapes 150, 160, 170. Again, the precise size and shape of a particular structural adhesive element is generally dictated by the expected material flow characteristics in the surrounding area of the sound-damping patch 14 and/or the main panel 12. The structural adhesive elements 150, 160, 170 may be arranged to operate independently, or they may be part of a sequence of non-periodic elements that are designed to cooperate and work together to control material flow in that area. Examples of the latter are the circular structural adhesive elements 150 that surround the opening 50 in FIG. 6, as well as the pattern of square and rectangular elements 170 in FIG. 7. Closed shape structural adhesive elements may also come in the form of triangles, polygons, as well as irregular shapes having no specific name. Once again, any number of different types and combinations of structural adhesive elements may be used to form a structural adhesive joint, as joints 18, 18', 118, 118' are not limited to the specific examples provided herein. The embodiments shown in FIGS. 1, 4, 6, and 7 are not meant to represent some specific combination, arrangement or pattern of structural adhesive elements, rather, they are meant to illustrate some of the different types of elements that may be used. It should also be appreciated that spot welds and structural adhesive joints are not mutually exclusive; while it is envisioned that structural adhesive joints will typically be used in lieu of spot welds, it is possible to use them in conjunction with one another.

Figure 8:
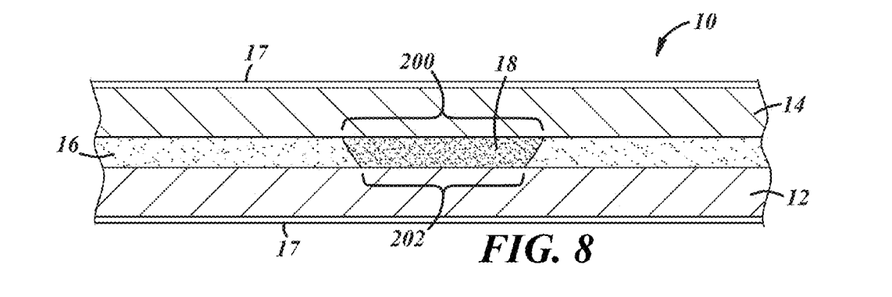
FIG. 8 is a sectional view of a portion of the panel assembly of FIG. 2 taken along lines 8-8, where the panel assembly includes both a viscoelastic adhesive layer and a structural adhesive joint located between the main panel and the sound-damping patch.

With reference to FIG. 8, there is shown a cross-sectional view of the panel assembly 10 where the viscoelastic adhesive layer 16 and the structural adhesive joint 18 are sandwiched between the main panel 12 and the sound-damping patch 14. Of course, the precise formation of the compressed structural adhesive joint 18 may vary from that shown here, as this drawing is simply meant to illustrate one potential arrangement. As discussed below in the passages describing potential manufacturing processes, it is possible for the viscoelastic layer 16 to be applied first to the sound-damping patch 14 and/or the main panel 12, the structural adhesive joint 18 to be applied next on top of the viscoelastic layer, and then for both the viscoelastic and structural adhesives to be compressed between the main panel and the patch when the two metal layers are brought together. If this sequence is followed, it is possible that a first interface 200 at a surface of the sound-damping patch 14 will include a higher percentage or proportion of viscoelastic adhesive material than is present at an opposing interface 202 located at a surface of the main panel 12. The exact amount of viscoelastic adhesive material and/or the precise proportion or ratio of adhesive materials may depend on a number of factors, including the relative viscosity of the adhesives, the order or sequence with which they are applied, etc. Once cured and solidified, the structural adhesive joint 18 may form a secure, rigid joint or attachment between the main panel 12 and the sound-damping patch 14, as described above. Furthermore, in this embodiment, the main panel 12 and the sound-damping patch may include an optional coating layer 17, such as those that include aluminum-based, zinc-based, painted, E-coated or nano-deposited coatings, for improving corrosion resistance.

Figure 9:
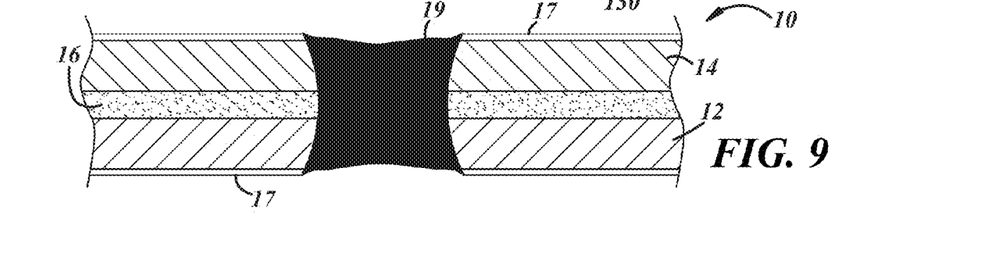
FIG. 9 is a sectional view of a panel assembly that includes both a viscoelastic adhesive layer and a spot weld located between the main panel and the sound-damping patch.

FIG. 9 shows the same cross-sectional view of the panel assembly 10 with the viscoelastic adhesive layer 16 located between the main panel 12 and the sound-damping patch 14 that include coating layer 17. Instead of using a structural adhesive joint, a spot weld 19 is provided to facilitate the attachment of the sound-damping patch 14 to the main panel 12. As shown, the coating layer 17 is burnt off or degraded in the area where the electrical current passes through to form spot weld 19. This can result in decreased corrosion protection in the areas including the spot weld, whereas in FIG. 8, the area with the structural adhesive joint 18 still includes coating layer 17. Spot welds can lead to other undesirable effects, such as a large heat affected zone where the viscoelastic layer is degraded, resulting in decreasing damping capability, bulging and other deformations, or even complete burn through of the panel assembly 10.

Figure 5:
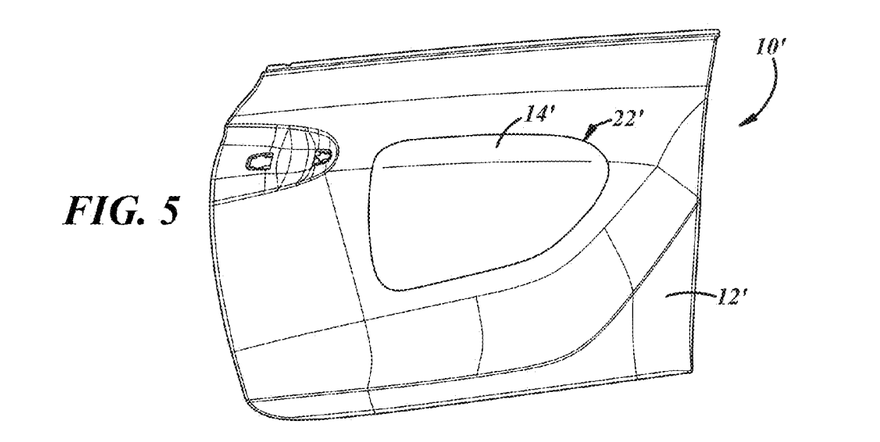
FIG. 5 is a perspective view of the panel assembly from FIG. 4 after the panel assembly is formed into a door outer.

Referring back to FIGS. 4 and 5, there is shown another potential application of the panel assembly where it is used to make a door outer for a vehicle. FIG. 4 shows an exemplary panel assembly 10' that has not yet been formed, and FIG. 5 shows the panel assembly 10' after being formed into a door outer for a vehicle. A structural adhesive joint 18' may be beneficial in the attachment of a sound-damping patch 14' while ensuring the aesthetic integrity of the class A surface, as door outers include visible surfaces where read through from a weld would be unacceptable. The exemplary panel assembly 10' generally includes a main panel 12', the sound-damping patch 14', a viscoelastic adhesive layer 16', and a structural adhesive joint 18' comprising multiple linear structural adhesive elements 30' that generally follow the perimeter of the sound-damping patch. In this particular embodiment, sound-damping patch 14' is located at an acoustically active region 22'.

During manufacturing, the sound-damping patch 14 is adhered, bonded and/or otherwise attached to the main panel 12 via the viscoelastic adhesive layer 16 and the structural adhesive joint 18 in order to form the panel assembly 10. The manufacturing process using a structural adhesive joint as opposed to a spot weld may be less expensive and have a lower cycle time. This process may be carried out according to one of several methods.

Referring to FIG. 1, both the viscoelastic adhesive layer 16 and the structural adhesive joint 18 may be applied to an underside of the sound-damping patch 14 before the patch is brought into contact with the main panel 12. According to one embodiment, the viscoelastic adhesive layer 16 is first applied to the underside of the sound-damping patch 14 by using a roll-coating, spraying and/or other process that covers the entire underside of the patch. In one embodiment, roll coating is preferred. Roll coating has high transfer efficiency and high production rates, thereby lowering manufacturing costs. Once the viscoelastic adhesive layer has been applied, one or more structural adhesive elements of the joint 18 are applied on top of the viscoelastic material. Depending on the manufacturing equipment and parameters that are used to apply the structural adhesive joint 18, the structural adhesive may be injected or delivered at a pressure that displaces or pushes aside the underlying viscoelastic adhesive layer as the structural adhesive is being dispensed. Displacing the already-coated viscoelastic adhesive layer 16 causes portions of the structural adhesive to directly contact the underside of the sound-damping patch 14 (i.e., a direct adhesive-to-metal contact). Customized adhesive delivery nozzles attached to a robotic arm or other automated delivery system may be utilized to control the size, shape and pressure of the adhesive bead as it is dispensed. After both the viscoelastic adhesive layer 16 and the structural adhesive joint 18 are applied, the sound-damping patch 14 may be aligned with and pressed against the main panel 12 so that the patch bonds to the panel. This may or may not be carried out with heat, ultra-violet or other radiation, and/or other stimulates to help activate and/or cure the adhesives involved. In one example, the uncured panel assembly is put through some type of bake oven or the like which activates both the viscoelastic and structural adhesives during the same process so that they bond with the adjoining metal layers and/or with each other. It is also possible to activate or cure these adhesives individually. Of course, the aforementioned process could be carried out by first applying the adhesive materials to the main panel 12, instead of applying them to the sound-damping patch 14.

In a different manufacturing embodiment, the structural adhesive joint 18 is applied to one of the main panel 12 or the sound-damping patch 14 while the viscoelastic adhesive layer 16 is separately applied to the other of the main panel and the patch. The sound-damping patch 14 is then mated with the main panel 12 so that the two different adhesive materials come into contact and, because of the higher viscosity and firmness of the structural adhesive, the structural adhesive pushes through or displaces the viscoelastic adhesive and is able to make direct contact with surfaces of both the patch 14 and the main panel 12; this may be helpful for establishing a strong structural bond. One way to ensure that the structural adhesive is firmer than the viscoelastic adhesive is to apply the structural adhesive in solvent form, as mentioned above, and then let the solvent-based carrier evaporate so that structural adhesive material hardens somewhat. This way, when the two adhesives are pressed together, the structural adhesive will push through the softer viscoelastic adhesive. Sufficient pressure and/or heat could then be provided to activate or cure the adhesives, such as in a laminate-type process.

In yet another potential manufacturing embodiment, the structural adhesive joint 18 is established first, then the viscoelastic adhesive layer 16 is applied over it. In this scenario, it is possible to use an adhesive delivery system with a cold gun or nozzle so that the structural adhesive material is dispensed on the main panel 12 and/or the sound-damping blank 14 at a somewhat cold or ambient temperature. This helps ensure that the structural adhesive material has a high viscosity and is rather firm. At some suitable time afterwards, the viscoelastic material may be sprayed or otherwise applied overtop of the structural adhesive material so that a multi-layer adhesive arrangement is created. The different adhesives may then be activated or cured according to any known technique, including the ones mentioned above. It should be appreciated that the panel assembly 10 may be manufactured according to any number of acceptable manufacturing processes and is not limited to those disclosed above. For instance, the viscoelastic adhesive layer 16 and the structural adhesive joint 18 may be applied to any combination of the main panel 12, the sound-damping patch 14, or to both, and may be done so in different orders or sequences. It is also possible for the viscoelastic adhesive and the structural adhesive to be miscible together, so that upon exposure to heat, cross-linking or any other type of inter-mingling of the respective polymers would occur.

Figure 10:
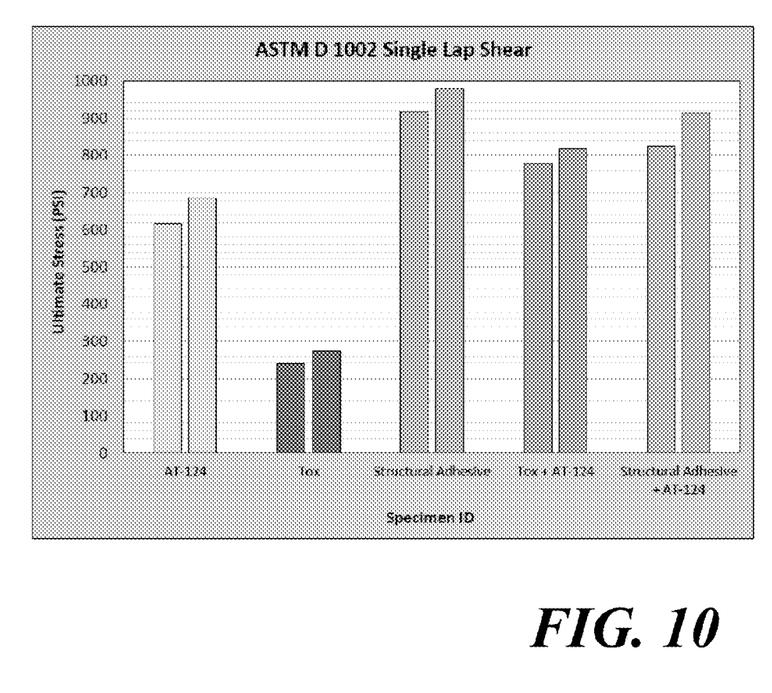
FIG. 10 is a graph showing stress results for a lap shear test comparing various adhesive and non-adhesive joints.

FIG. 10 shows the results of a lap shear test that compares the strength of several different joints between two metal sheets (a first metal sheet with a thickness of 0.85 mm and a second metal sheet with a thickness of 0.58 mm), including adhesive joints, mechanical joints and both. Lap shear testing is a method for testing adhesion by pulling bonded layers apart along the plane of adhesion. As designated on the X-axis, there were five different specimens or types of joints that were measured, and three samples were tested for each specimen. The two bars in the graph for each specimen represent the minimum and maximum lap shear strength of each specimen tested. AT-124 represents an ambient temperature viscoelastic adhesive material, such as one that can be used as the sound damping adhesive layer, applied in a 1 in.×1 in. square. TOX represents a mechanical TOX joint having a 0.25 in. diameter with no adhesive; skilled artisans will appreciate that mechanical TOX joints can exhibit similar bonding strength to spot welds. The structural adhesive is an epoxy-based structural adhesive, such as the kind that may be used in the structural adhesive joint. The two specimens on the far right represent a combined TOX joint with the viscoelastic material and a combined structural adhesive joint with the viscoelastic material, respectively. The TOX joint with the viscoelastic material includes a TOX joint with a 0.25 in. diameter centered in a 1 in.×1 in. square of viscoelastic adhesive. The structural adhesive joint consists of a curved epoxy-based adhesive bead on top of a 1 in.×1 in. square of viscoelastic adhesive. As shown, the structural adhesive with the viscoelastic layer is at least comparable in strength to the other joints, including those having a mechanically joined TOX joint.

Figure 11:
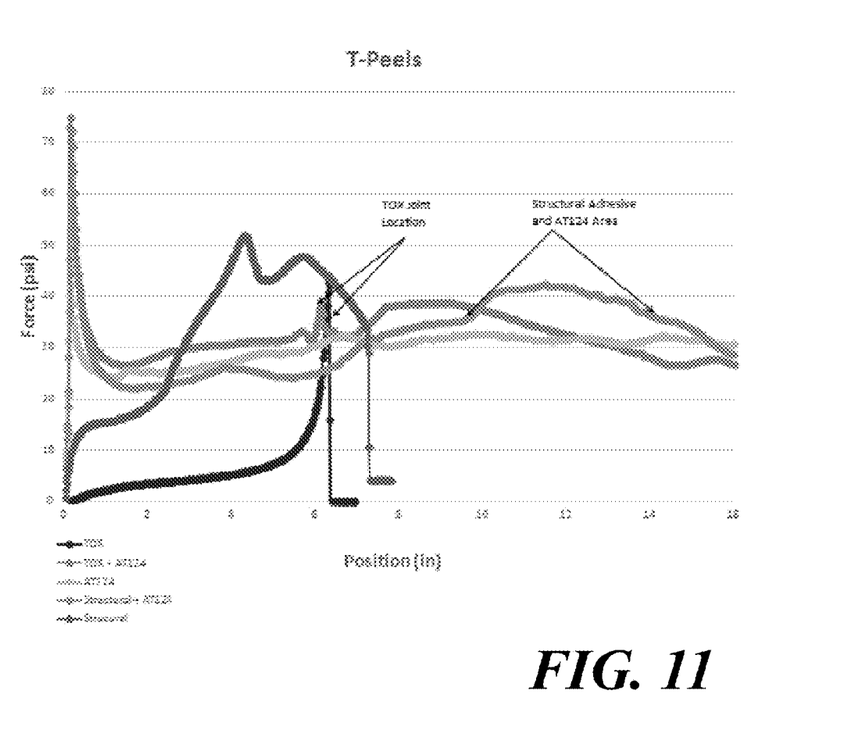
FIG. 11 is a graph showing resulting force from a T-peel adhesion test comparing various adhesive and non-adhesive joints.

FIG. 11 is a graph showing the results of a T-Peel test that compares the peel strength of the same specimens from FIG. 10. The T-peel test is a type of tensile test performed upon two substrates that have been bonded together and placed into peel test grips such that one substrate sticks up and the other sticks down while the bonded area sticks out horizontally so that the entire setup generally forms a "T" shape. The position in inches that the respective substrates are spread from each other is plotted on the X-axis against the peel force applied on the Y-axis. As shown in the graph, the TOX joint resulted in mechanical failure between about 6 in. and 8 in. And again, the structural adhesive joint with a viscoelastic adhesive were at least comparable in peel strength to other joints, including those having a mechanically joined TOX joint.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A panel assembly, comprising:
   a main panel having an acoustically active region, the acoustically active region is exposed to a sound source, a vibration source, or both;
   a sound-damping patch adhered to the main panel, the sound-damping patch is smaller in size than the main panel and is located on the main panel so that it covers at least a portion of the acoustically active region;
   a sound-damping adhesive layer at least partially located between the main panel and the sound-damping patch, the sound-damping adhesive layer adheres the sound-damping patch to the main panel and is located on the main panel so that covers at least a portion of the acoustically active region; and
   a structural adhesive joint at least partially located between the main panel and the sound-damping patch and having a plurality of structural adhesive elements, wherein the sound-damping adhesive layer covers a surface of the sound-damping patch while the plurality of structural adhesive elements are arranged according to the shape of the sound-damping patch, wherein the structural adhesive elements are located in discrete positions along the surface of the sound-damping patch or the sound-damping adhesive layer, wherein at least two structural adhesive elements are separated by an interruption with the sound-damping adhesive layer located therebetween.

2. The panel assembly of claim 1, wherein the main panel is made of metal and has a thickness of about 0.4 mm to 3.0 mm, inclusive, the sound-damping patch is made of metal and has a thickness of about 0.2 mm to 3.0 mm, inclusive, and the sound-damping adhesive layer is a viscoelastic adhesive layer and has a thickness of about 0.005 mm to 0.05 mm, inclusive.

3. The panel assembly of claim 1, wherein the sound-damping adhesive layer includes an acrylate-based material and the structural adhesive joint includes an epoxy-based material, and the epoxy-based material of the structural adhesive joint has a higher viscosity at ambient temperature than the acrylate-based material of the sound-damping adhesive layer.

4. The panel assembly of claim 1, wherein the structural adhesive joint includes an epoxy as a main backbone of the structural adhesive and is cross-linked with one or more additional materials selected from the list consisting of: a urethane, an acrylate, a methacrylate, an acrylonitrile, a phenolic, or a combination thereof.

5. The panel assembly of claim 4, wherein the structural adhesive joint includes at least one material selected from the list consisting of: an epoxy-urethane, an epoxy-acrylate, an epoxy-methacrylate, an epoxy-acrylonitrile or an epoxy-phenolic.

6. The panel assembly of claim 1, wherein the sound-damping adhesive layer covers an entire surface of the sound-damping patch that faces the main panel, while the structural adhesive joint covers only a portion of the surface of the sound-damping patch that faces the main panel, and the structural adhesive joint is applied on top of the sound-damping adhesive layer.

7. The panel assembly of claim 6, wherein the sound-damping adhesive layer is roll coated across the entire surface of the sound-damping patch that faces the main panel and the structural adhesive joint is applied in a bead on top of the sound-damping adhesive layer so that the structural adhesive joint displaces the sound-damping adhesive layer and contacts the surface of the sound-damping patch that faces the main panel.

8. The panel assembly of claim 1, wherein the plurality of structural adhesive elements includes a plurality of thin elongated segments that are arranged end-to-end with a plurality of interruptions located therebetween so that segments and interruptions together form a series sequence of structural adhesive elements on the sound-damping patch.

9. The panel assembly of claim 1, wherein the plurality of structural adhesive elements includes a plurality of thin elongated segments that are arranged side-by-side with one another so that segments form a parallel sequence of structural adhesive elements on the sound-damping patch.

10. The panel assembly of claim 1, wherein the main panel includes a first coating layer on a surface that faces away from the sound-damping patch and the sound-damping patch includes a second coating layer on a surface that faces away from the main panel, and both the first and second coating layers provide corrosion resistance and are present on the main panel and the sound-damping patch, respectively, in the area of the structural adhesive joint.

11. The panel assembly of claim 1, wherein the panel assembly is in the form of a finished dash panel for a vehicle and includes an opening passing through both the main panel and the sound-damping patch in order to accommodate a steering column.

12. The panel assembly of claim 1, wherein the panel assembly is in the form of a finished door outer for a vehicle.

13. A panel assembly, comprising:
a main panel having an acoustically active region, the acoustically active region is exposed to a sound source, a vibration source, or both;
a sound-damping patch adhered to the main panel, the sound-damping patch is smaller in size than the main panel and is located on the main panel so that it covers at least a portion of the acoustically active region;
a sound-damping adhesive layer at least partially located between the main panel and the sound-damping patch, the sound-damping adhesive layer adheres the sound-damping patch to the main panel and is located on the main panel so that covers at least a portion of the acoustically active region; and
a structural adhesive joint at least partially located between the main panel and the sound-damping patch and having a plurality of structural adhesive elements, wherein the sound-damping adhesive layer covers a surface of the sound-damping patch while the plurality of structural adhesive elements are arranged according to the shape of the sound-damping patch, wherein the plurality of structural adhesive elements includes one or more thin elongated segments that are arranged according to a non-periodic pattern and that follow at least a portion of an outer perimeter of the sound-damping patch.

14. A panel assembly, comprising:
a main panel having an acoustically active region, the acoustically active region is exposed to a sound source, a vibration source, or both;
a sound-damping patch adhered to the main panel, the sound-damping patch is smaller in size than the main panel and is located on the main panel so that it covers at least a portion of the acoustically active region;
a sound-damping adhesive layer at least partially located between the main panel and the sound-damping patch, the sound-damping adhesive layer adheres the sound-damping patch to the main panel and is located on the main panel so that covers at least a portion of the acoustically active region; and
a structural adhesive joint at least partially located between the main panel and the sound-damping patch and having a plurality of structural adhesive elements, wherein the sound-damping adhesive layer covers a surface of the sound-damping patch while the plurality of structural adhesive elements are arranged according to the shape of the sound-damping patch, wherein the sound-damping patch includes an opening for accommodating a component that is not part of the panel assembly, and the plurality of structural adhesive elements includes one or more thin elongated segments that are arranged according to a non-periodic pattern and that follow at least a portion of an inner perimeter of the opening.

15. A method for making a panel assembly, comprising the steps of:
providing a main panel made of metal;

providing a sound-damping patch made of metal, the sound-damping patch is smaller in size than the main panel;

applying a sound-damping adhesive to at least one of the main panel or the sound-damping patch;

applying a structural adhesive to the at least one of the main panel or the sound-damping patch on top of the sound-damping adhesive, wherein the structural adhesive has a higher viscosity at ambient temperature than the sound-damping adhesive and is applied so that the structural adhesive at least partially displaces the sound-damping adhesive and contacts the at least one of the main panel or the sound-damping patch; and bonding the sound-damping patch to the main panel with both the sound-damping adhesive and the structural adhesive in order to form the panel assembly.

16. The method of claim 15, wherein the bonding step further comprises bonding both the sound-damping adhesive and the structural adhesive with heat and pressure at the same time.

17. The method of claim 15, further comprising the step:

subjecting the panel assembly to a stamping, drawing or other metal forming operation, wherein during the stamping, drawing or other metal forming operation the structural adhesive joint maintains the sound-damping patch on the main panel so that material flow from at least one of the main panel or the sound-damping patch is at least partially controlled.

* * * * *

UNITED STATES PATENT AND TRADEMARK OFFICE
CERTIFICATE OF CORRECTION

PATENT NO.        : 9,524,711 B2
APPLICATION NO.   : 14/894216
DATED             : December 20, 2016
INVENTOR(S)       : Devon E. Owen, Jr. et al.

Page 1 of 1

It is certified that error appears in the above-identified patent and that said Letters Patent is hereby corrected as shown below:

In the Claims

Column 12, Claim 1, Line 63, add -- it -- between the words "so that" and "covers at".

Column 14, Claim 13, Line 23, add -- it -- between the words "so that" and "covers at".

Column 14, Claim 14, Line 49, add -- it -- between the words "so that" and "covers at".

Signed and Sealed this
Ninth Day of May, 2017

Michelle K. Lee
*Director of the United States Patent and Trademark Office*